(12) United States Patent
Hedman et al.

(10) Patent No.: US 9,464,700 B2
(45) Date of Patent: Oct. 11, 2016

(54) IDLER OR ROLLER DEVICE

(71) Applicants: Torbjorn Hedman, Saint Cyr sur Loire (FR); Nicolas Tronquoy, Fondettes (FR)

(72) Inventors: Torbjorn Hedman, Saint Cyr sur Loire (FR); Nicolas Tronquoy, Fondettes (FR)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 14/662,265

(22) Filed: Mar. 19, 2015

(65) Prior Publication Data
US 2015/0267791 A1 Sep. 24, 2015

(30) Foreign Application Priority Data
Mar. 19, 2014 (FR) .................................... 1452270

(51) Int. Cl.
| | | |
|---|---|---|
| F16H 7/20 | (2006.01) | |
| F16H 55/36 | (2006.01) | |
| F16C 13/00 | (2006.01) | |
| F16B 41/00 | (2006.01) | |
| F16H 57/00 | (2012.01) | |
| F16H 7/08 | (2006.01) | |

(52) U.S. Cl.
CPC .............. *F16H 7/20* (2013.01); *F16C 13/006* (2013.01); *F16H 55/36* (2013.01); *F16B 41/002* (2013.01); *F16H 2007/0865* (2013.01); *F16H 2057/0093* (2013.01)

(58) Field of Classification Search
CPC .... F16C 13/006; F16C 2361/63; F16H 7/20; F16H 55/36
USPC .................................................. 474/199, 198
See application file for complete search history.

(56) References Cited

U.S. PATENT DOCUMENTS

| | | | | |
|---|---|---|---|---|
| 4,863,293 A * | 9/1989 | Sytsma | ................ | F16C 13/006 277/366 |
| 6,241,257 B1 * | 6/2001 | Hauck | ................... | F16B 41/002 277/637 |
| 6,357,926 B1 * | 3/2002 | Hauck | ................... | F16C 13/006 384/546 |
| 7,695,385 B2 * | 4/2010 | Barraud | ................. | F16C 19/06 384/484 |
| 8,235,851 B2 * | 8/2012 | Eidloth | ................. | F16C 13/006 474/199 |
| 2004/0097313 A1 * | 5/2004 | Singer | ................... | F16C 13/006 474/199 |
| 2004/0235599 A1 * | 11/2004 | Ozorak | ................. | F16C 13/006 474/199 |
| 2005/0261092 A1 * | 11/2005 | Ochiai | ................... | F16D 41/066 474/70 |

(Continued)

FOREIGN PATENT DOCUMENTS

| | | |
|---|---|---|
| DE | 10003208 A1 | 8/2001 |
| DE | 202007010473 U1 | 9/2007 |
| DE | 102007039131 A1 | 2/2009 |

*Primary Examiner* — Henry Liu
(74) *Attorney, Agent, or Firm* — Bryan Peckjian; SKF USA Inc. Patent Dept.

(57) ABSTRACT

A tension roller or reel device for a torque transmission element. The device comprises at least one bearing having one inner race, one outer race and at least one row of rolling elements between the inner race and the outer race, a pulley on top of the outer race, and a retaining screw inserted into a central bore of the inner race. The bore of the inner race is provided with a circumferential cavity in which an elastic ring is fitted non-securely and integrally, the cavity having an axial length strictly greater than the axial dimension of the elastic ring.

11 Claims, 2 Drawing Sheets

(56) References Cited

U.S. PATENT DOCUMENTS

| | | | |
|---|---|---|---|
| 2007/0025655 A1* | 2/2007 | Barraud | F16C 19/06 384/546 |
| 2007/0072714 A1* | 3/2007 | Filip | F16C 13/006 474/144 |
| 2008/0220921 A1* | 9/2008 | Yanai | F16H 55/48 474/199 |
| 2009/0098967 A1* | 4/2009 | Eidloth | F16C 13/006 474/199 |
| 2009/0298630 A1* | 12/2009 | Mineno | F16C 35/063 474/199 |
| 2010/0016109 A1* | 1/2010 | Walton | F16H 55/50 474/199 |
| 2012/0142470 A1* | 6/2012 | Varnnoux | F16C 13/006 474/199 |

* cited by examiner

IDLER OR ROLLER DEVICE

CROSS REFERENCE TO RELATED APPLICATIONS

This is a Non-Provisional Patent Application, filed under the Paris Convention, claiming the benefit of French Patent Application Number 1452270 filed on 19 Mar. 2014 (Mar. 19, 2014), which is incorporated herein by reference in its entirety.

FIELD OF THE INVENTION

The present invention relates to the field of tension rollers or reels intended to interact with a torque transmission element such as a chain or a belt, for example a timing belt of an internal combustion engine of a motor vehicle.

PRIOR ART

Such tension rollers or reels are generally used to maintain a constant tension on the torque transmission element within a set range or to modify locally the pathway adopted by the latter. In such rollers, a pulley is rotatably mounted on an axis by means of a bearing, the roller subsequently being attached directly or indirectly to the engine block or to an element of the tension roller device, for example an articulated arm or an eccentric.

It is generally known to provide the bearing with a central bore into which a threaded screw is inserted, the screw being intended to be screwed into a tapped opening provided on a wall of the engine block in such a way as to permit the attachment of the roller on the engine block.

The tension roller comprising the pulley, the bearing and the screw is preassembled at the manufacturer's premises before subsequently being delivered as a construction module to the assembly site of the motor vehicle engine. It is therefore necessary to provide a means of retaining the screw in the roller in order to prevent any movement or shock during transport and likewise to supply a construction module that is ready for mounting directly on the engine block.

It is known from document DE 100 03 208 A1 to provide a sleeve between the screw and the bore of the inner race of the bearing. The sleeve comprises a cavity into which is inserted an elastic ring which provides axial retention of the screw in the assembled roller.

However, if full or partial removal of the screw is required during the operation of mounting the roller, notably in order to have the head of the screw emerge from the roller, it will then be very difficult to move the screw axially because of the forces applied to the elastic ring. Specifically, the latter is compressed radially between the cylindrical surface of the cavity and the periphery of the screw, but is also compressed between an edge of the cavity if an axial force is applied to the screw in this direction.

OBJECT AND BRIEF SUMMARY OF THE INVENTION

The invention proposes more particularly to address these problems by proposing a new tension roller or reel that is simple to produce and to install, with a reduced number of elements, assuring the effective retention of the screw in a reduced space while allowing the screw to be removed easily.

For this purpose, the invention relates to a tension roller or reel device for a torque transmission element comprising at least one bearing having one inner race, one outer race and at least one row of rolling elements between the inner and outer races, a pulley on top of the outer race and a retaining screw inserted into a central bore of the inner race.

In accordance with the invention, the bore of the inner race is provided with a circumferential cavity in which an elastic ring is fitted non-securely and integrally, the cavity having an axial length strictly greater than the axial dimension of the elastic ring.

The cavity provided in the bore of the inner race consists of a circumferential cylindrical portion having a radial diameter that is greater than the radial diameter of the cylindrical surface of the bore.

Thanks to the invention, the immobilization of the screw in the bearing is realized by an elastic ring comprised axially between the two radial edges of the extremity of the inner race, thereby permitting a minimum axial dimension.

In addition, the elastic ring being integrated into an inner cavity of the inner race, the radial dimension is greatly reduced.

Another advantage of the present invention is that if the screw is fully or partially removed from the roller, namely if an axial force is applied from the free end of the screw towards the head of the screw, the elastic ring has a length of travel available to it in the cavity. Thus the ring moves by sliding and/or turning in the cavity in the direction of the force applied to the screw and offers only moderate resistance to the force applied.

According to advantageous but not obligatory aspects of the invention, such a tension roller or reel device may incorporate one or a plurality of the following characterizing features taken in any technically permissible combination:
The rolling elements of the bearing are balls.
The rolling elements are rollers or needles.
The rolling elements of the bearing are maintained more or less regularly spaced circumferentially by a cage.
The outer race of the bearing forms the pulley of the roller device, in such a way that the outer cylindrical surface of the outer race interacts with the torque transmission element.
The cavity provided in the inner bore of the inner race extends axially between one extremity of the bore and a shoulder formed between a cylindrical surface forming the cavity and a cylindrical surface with a smaller diameter forming the bore.
If the cavity provided in the inner bore of the inner race extends axially from an opposite extremity of the bore from the head of the screw, then the elastic ring is aligned axially in relation to the extremity of the bore.
If the cavity provided in the inner bore of the inner race extends axially from an extremity of the bore at the head end of the screw, then the elastic ring is positioned in the immediate vicinity of the shoulder formed between a cylindrical surface forming the cavity and a cylindrical surface with a smaller diameter forming the bore.
The cavity extends axially between two shoulders formed at each extremity of a cylindrical surface forming the cavity and a cylindrical surface with a smaller diameter forming the bore.
The axial length of the cavity is at least two times greater than the axial dimension of the elastic ring.
The inner race comprises on a radial edge a blind opening, of which the diameter and the depth are adapted to receive all or part of a head of the screw in such a way that the extremity of the screw head does not extend axially beyond the bearing and/or the pulley.

The axial length of the cavity is greater than or equal to the axial depth of the blind opening provided on a radial edge of the inner race and receiving the head of the screw.

The retaining ring is continuous circumferentially.

The retaining ring is made of an elastic polymer material.

The retaining ring is provided with an axial slot, in such a way that the ring is compressed radially beforehand in order to insert it and to cause it to slide in the bore of the inner race and then in the cavity where it returns to its original shape.

The invention likewise relates to an internal combustion engine comprising at least one tension roller or reel device for a torque transmission element according to one of the embodiments mentioned above.

BRIEF DESCRIPTION OF THE DRAWINGS

The invention will be more readily understood, and other advantages thereof will be appreciated more clearly, in the light of the following description of 2 embodiments of a tension roller or reel device consistent with its principle, given here only by way of example and made with reference to the accompanying drawings, in which.

DETAILED DESCRIPTION OF THE PRESENT INVENTION

Figure 1:
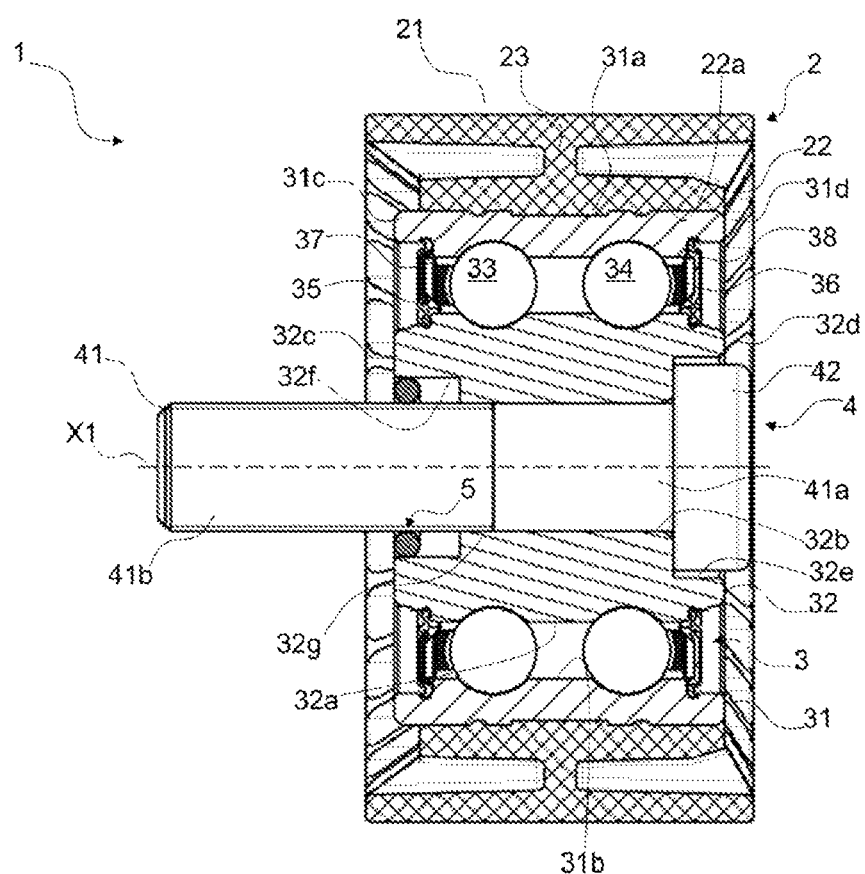
FIG. 1 is a view in cross section of a roller according to a first embodiment.

A tension roller or reel in its entirety is designated by the reference 1 and has a central axis X1. The roller 1 comprises a pulley 2, a bearing 3 and a retaining screw 4, these elements being coaxial to the axis X1 in normal operating mode.

The screw 4 comprises the body 41 in the shape of a rod and a head 42 at one of the free extremities of the body 41. The body 41 includes a smooth portion 41a, of which the outer cylindrical surface is smooth, in proximity to the head 42. The body 41 likewise includes a threaded portion 41b on the other side of the head 42.

The pulley 2 comprises an outer part 21 exhibiting an outer cylindrical surface intended to interact with a torque transmission element (not illustrated) such as a belt or a chain. The pulley 2 likewise comprises an axial inner part 22 and a radial annular intermediate portion 23 connecting the inner part 22 and outer part 21. The inner part 22 and the outer part 21 are coaxial with the axis X1. The inner part 22 comprises a bore 22a in which the bearing 3 is mounted.

The bearing 3 comprises one inner race 31, one outer race 32, two rows of rolling elements 33 and 34, in this case balls, arranged in parallel planes retained respectively by cages 35 and 36, and two sealing joints 37 and 38.

The outer race 31 comprises an outer cylindrical surface 31a that is consistent in shape with the bore 22a of the pulley 2. Preferably, the pulley 2 is moulded onto the outer race 31. The outer race 31 likewise comprises a bore 31b, in which are arranged bearing raceways for the rolling elements 33 and 34, and grooves, into which are pressed the sealing joints 37 and 38, the joints forming a static seal with the rotating outer race 31.

The inner race 32 comprises an outer cylindrical surface 32a, in which are arranged bearing raceways for the rolling elements 33 and 34, and grooves, intended to provide contact with the sealing joints 37 and 38, the joints forming a dynamic seal with the non-rotating inner race 32.

The outer race 31 is delimited axially by two frontal radial edges 31c and 31d, and the inner race is delimited axially by two frontal radial edges 32c and 32d, in such a way that the edges are respectively aligned axially.

The inner race 32 likewise comprises a transverse cylindrical bore 32b, into which a body 41 of the retaining screw 4 is inserted. The bore 32b is a central opening passing axially through the inner race 32 and discharges at each of its extremities in the area of the radial edges 32c and 32d. The threaded portion 41b of the body 41 projects axially in relation to the radial edge 32c of the inner race 32 and is intended to be inserted into a tapped hole provided in a component intended to support the roller 1, in particular a wall of an engine block for a motor vehicle.

Axially on the opposite side, the inner race comprises a blind opening 32e, on the radial edge 32d of which the diameter and the depth are adapted to receive all or part of the head 42 of the screw 4 in such a way that the extremity of the screw head 42 does not extend axially beyond the pulley 2. Provision may likewise be made for the opening 32e to be dimensioned in such a way that the head 42 does not extend axially beyond the radial edge 32d.

Thanks to such an arrangement, it is possible to reduce the axial dimension of the roller 1 mounted on its support as well as the weight of the entire assembly.

In accordance with the invention, the bore 32b of the inner race 32 comprises a cavity 32f which consists of a circumferential cylindrical portion having a radial diameter that is greater than the radial diameter of the cylindrical surface of the bore 32b.

According to FIG. 1 illustrating a first embodiment of the present invention, the cavity 32f extends axially between the radial edge 32c of the inner race 32, on the side of the engine block and the opposite side to the head 42 of the screw 4, and a shoulder 32g formed between the cylindrical surface forming the cavity 32f and the cylindrical surface with a smaller diameter forming the bore 32b.

The cavity 32f has an axial length at least equal to the depth of the blind opening 32e in which the head 42 of the screw 4 is at least partially integrated.

According to the invention, an elastic ring 5 is fitted non-securely and integrally in the cavity 32f and allows an axial immobilization of the screw 4 in relation to the bearing 3. The elastic ring 5 is aligned axially with the radial edge 32c of the inner race 32.

The elastic ring 5 has a radial dimension strictly greater than the depth of the cavity 32f such that the ring 5 extends radially beyond the bore 32b. The screw body 41 fitted in the bore 32b radially compresses the elastic ring 5 and the retention is assured by radial tightening.

Thanks to the invention, the axial immobilization of the screw is assured by radial tightening and is reversible. In fact, there is the possibility for an operator to exert an axial force F1 at the extremity of the threaded portion 41b of the screw 4 in the direction of the screw head 42, if necessary, in such a way as to cause the screw head 42 to emerge from the opening 32e.

This removal operation is made far easier by the axial length available to the elastic ring 5 in the cavity 32f thus allowing it to move by sliding and/or turning in the direction of the force applied to the screw, until abutment with the shoulder 32g occurs.

While the roller 1 is being transported, the elastic ring 5 provides the screw 4 with the necessary and sufficient retention while at the same time providing the possibility of being easily retractable for the operation of final fixing of the roller 1.

In addition, because the axial length of the cavity 32f is at least equal to the depth of the blind opening 32e, the entire portion of the head 42 incorporated therein can be made to emerge in its entirety.

Since the elastic ring 5 is mainly integrated radially into the cavity 32f which is itself positioned axially between the two radial edges 32c, 32d of the inner race 32, the radial and axial size of the device is small.

Figure 2:
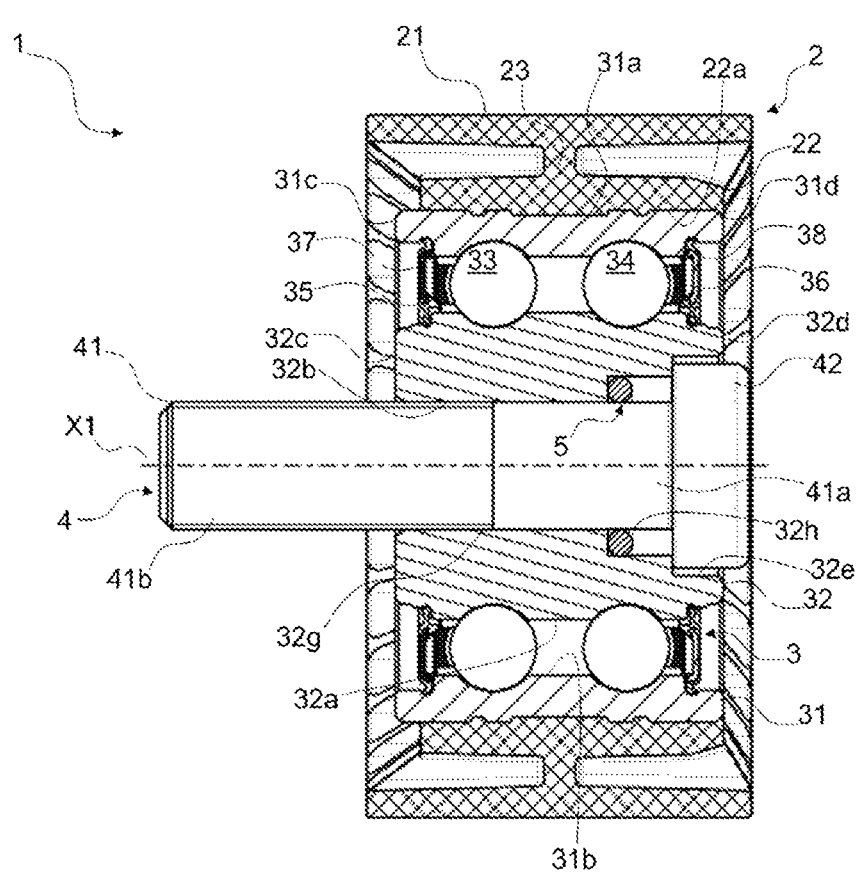
FIG. 2 is a view in cross section of a roller according to a second embodiment.

According to a second embodiment illustrated in FIG. 2, in which the elements that are identical have the same references, the roller 1 differs from the previous embodiment in that a cavity 32h extends axially between the radial edge 32d of the inner race 32, on the same side as the head 42 of the screw 4 and on the opposite side from the engine block, and a shoulder 32i formed between the cylindrical surface that forms the cavity 32h and the cylindrical surface with a smaller diameter that forms the bore 32b.

The cavity 32h has an axial length at least equal to the depth of the blind opening 32e in which the head 42 of the screw 4 is at least partially integrated.

According to the invention, an elastic ring 5 is fitted non-securely and integrally in the cavity 32h and assures axial immobilization of the screw 4 in relation to the bearing 3. The elastic ring 5 is positioned axially in the immediate vicinity of the shoulder 32i.

The elastic ring 5 has a radial dimension strictly greater than the depth of the cavity 32f such that the ring 5 extends radially beyond the bore 32b. The screw body 41 fitted in the bore 32b radially compresses the elastic ring 5 and the retention is assured by radial tightening.

As with the first embodiment, axial immobilization of the screw is assured by radial tightening and is reversible. The initial position of the ring 5 near the shoulder 32i allows it to move by sliding and/or turning in the direction of the force applied to the screw in the cavity 32h. In addition, because retention is assured by the ring 5 on the smooth portion 41a of the body 41 of the screw 4, there is no risk of damaging the threads of the threaded portion 41b.

The technical characteristics of the embodiments and variants envisaged above may be combined with each other.

The invention claimed is:

1. A tension roller or reel device for a torque transmission element comprising:
    at least one bearing having one inner race, one outer race and at least one row of rolling elements between the inner race and the outer race,
    a pulley on top of the outer race, and
    a retaining screw inserted into a central bore of the inner race,
    wherein the bore of the inner race includes a circumferential cavity, and an elastic ring in the circumferential cavity, the elastic ring being retained in the circumferential cavity by a friction fit and being configured to roll axially or slide axially or to both roll axially and slide axially in the circumferential cavity, the cavity having an axial length greater than the axial dimension of the elastic ring, wherein
    the elastic ring has a radial dimension greater than the depth of the cavity such that the ring extends radially beyond the bore, and wherein
    the screw body fitted in the bore radially compresses the elastic ring and retention is assured by radial tightening.

2. The tension roller or reel device according to claim 1, wherein the cavity provided in the bore of the inner race extends axially between one extremity of the bore and a shoulder formed between a cylindrical surface forming the cavity and a cylindrical surface with a smaller diameter forming the bore.

3. The tension roller or reel device according to claim 2, wherein, the inner bore of the inner race extends axially from an opposite extremity of the bore from a head of the screw, and the elastic ring is aligned axially in relation to the extremity of the bore.

4. The tension roller or reel device according to claim 1, the inner race further comprises on a radial edge a blind opening, of which the diameter and the depth are adapted to receive one of part of a head of the screw and all of the head of the screw in such a way that the extremity of the head of the screw does not extend axially beyond at least one of the bearing and the pulley.

5. The tension roller or reel device according to claim 4, wherein the axial length of the cavity is one of greater than the axial depth of the blind opening provided at a radial edge of the inner race or equal to the axial depth of the blind opening provided at a radial edge of the inner race and receiving the head of the screw.

6. An internal combustion engine comprising:
    at least one tension roller or reel device comprising:
    at least one bearing having one inner race, one outer race and at least one row of rolling elements between the inner race and the outer race,
    a pulley on top of the outer race, and
    a retaining screw inserted into a central bore of the inner race,
    wherein the bore of the inner race includes a circumferential cavity in which an elastic ring is fitted non-securely and integrally, the cavity having an axial length strictly greater than the axial dimension of the elastic ring,
    wherein the at least one tension roller or reel device is integrated into to a torque transmission element of an engine, wherein
    the elastic ring has a radial dimension greater than the depth of the cavity such that the ring extends radially beyond the bore, and wherein
    the screw body fitted in the bore radially compresses the elastic ring and retention is assured by radial tightening.

7. A tension roller or reel device for a torque transmission element comprising:
    at least one bearing having one inner race, one outer race and at least one row of rolling elements between the inner race and the outer race,
    a pulley on top of the outer race, and
    a retaining screw inserted into a central bore of the inner race,
    wherein the bore of the inner race includes a circumferential cavity and means for retaining the retaining screw, the cavity having an axial length greater than an axial dimension of the means for retaining the retaining screw, wherein
    the elastic ring has a radial dimension greater than the depth of the cavity such that the ring extends radially beyond the bore, and wherein
    the screw body fitted in the bore radially compresses the elastic ring and retention is assured by radial tightening.

8. The tension roller or reel device according to claim 7, wherein the means for retaining the retaining screw comprises an elastic ring in the circumferential cavity.

9. The tension roller or reel device according to claim 8, wherein the elastic ring is configured and dimensioned to form a friction fit with the circumferential cavity.

10. The tension roller or reel device according to claim 8, wherein the elastic ring is configured and dimensioned to roll or slide or to roll and slide in the circumferential cavity.

11. The tension roller or reel device according to claim 8, wherein an inner bore of the inner race extends axially from an opposite extremity of the bore from a head of the screw, and the elastic ring is aligned axially in relation to the extremity of the bore.

* * * * *